(12) United States Patent
Lee et al.

(10) Patent No.: US 10,728,640 B2
(45) Date of Patent: Jul. 28, 2020

(54) ELECTRONIC DEVICE WITH HEAT RADIATION STRUCTURE USING AUDIO DEVICE

(71) Applicant: Samsung Electronics Co., Ltd., Gyeonggi-do (KR)

(72) Inventors: Yo-Han Lee, Gyeonggi-do (KR); Jung-Kyun Ryu, Gyeonggi-do (KR); Jun-Ho Park, Seoul (KR); Won-Sik Song, Seoul (KR); Jong-Chan Won, Gyeonggi-do (KR); Seung-Yong Lee, Gyeonggi-do (KR); Young-Su Lee, Gyeonggi-do (KR); Bo-Kun Choi, Seoul (KR); Chang-Ryong Heo, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 55 days.

(21) Appl. No.: 16/033,652

(22) Filed: Jul. 12, 2018

(65) Prior Publication Data

US 2019/0020938 A1 Jan. 17, 2019

(30) Foreign Application Priority Data

Jul. 12, 2017 (KR) .................. 10-2017-0088488

(51) Int. Cl.
*H04R 1/02* (2006.01)
*F21V 33/00* (2006.01)
(Continued)

(52) U.S. Cl.
CPC .............. *H04R 1/028* (2013.01); *F21K 9/23* (2016.08); *F21V 29/70* (2015.01);
(Continued)

(58) Field of Classification Search
CPC ........ H04R 9/022; H04R 1/025; H04R 1/028; H04R 1/34; H04R 1/345; G01K 11/26
See application file for complete search history.

(56) References Cited

U.S. PATENT DOCUMENTS

| 2010/0189295 | A1 | 7/2010 | Datz et al. |
| 2012/0230499 | A1* | 9/2012 | Suzuki ................... H04R 1/025 381/55 |

(Continued)

FOREIGN PATENT DOCUMENTS

| CN | 106704859 | 5/2017 |
| KR | 10-2015-0029233 | 3/2015 |

(Continued)

OTHER PUBLICATIONS

International Search Report dated Oct. 17, 2018 issued in counterpart application No. PCT/KR2018/007902, 4 pages.

(Continued)

*Primary Examiner* — Sunita Joshi
(74) *Attorney, Agent, or Firm* — The Farrell Law Firm, P.C.

(57) ABSTRACT

An electronic device with a heat radiation structure using an audio device is provided. The electronic device includes a first housing, a speaker module disposed on a surface of the first housing and configured to output sounds in a first direction, a sound reflection plate mounted above the surface of the first housing and having a first surface facing the speaker module, and a heat emission device disposed on a second surface of the sound reflection plate. The sound reflection plate may absorb heat generated from the heat emission device, and discharge the absorbed heat to the outside of the electronic device through a space between the surface of the first housing and the first surface of the sound reflection plate.

20 Claims, 9 Drawing Sheets

(51) Int. Cl.
*H04R 9/02* (2006.01)
*H04R 1/34* (2006.01)
*H05B 45/20* (2020.01)
*H04R 1/08* (2006.01)
*G10L 17/00* (2013.01)
*G10L 15/22* (2006.01)
*F21K 9/23* (2016.01)
*F21V 29/70* (2015.01)
*F21Y 115/10* (2016.01)

(52) U.S. Cl.
CPC .......... *F21V 33/0056* (2013.01); *G10L 15/22* (2013.01); *G10L 17/005* (2013.01); *H04R 1/34* (2013.01); *H04R 9/025* (2013.01); *H05B 45/20* (2020.01); *F21Y 2115/10* (2016.08); *H04R 1/025* (2013.01); *H04R 1/083* (2013.01); *H04R 1/345* (2013.01)

(56) References Cited

U.S. PATENT DOCUMENTS

| | | |
|---|---|---|
| 2013/0016864 A1 | 1/2013 | Ivey et al. |
| 2013/0083537 A1 | 4/2013 | Harwood |
| 2014/0286011 A1 | 9/2014 | Luna et al. |
| 2015/0070895 A1* | 3/2015 | Yotsumoto ............ H04R 1/028 362/253 |
| 2015/0153037 A1 | 6/2015 | Lee |
| 2015/0319515 A1* | 11/2015 | Devantier ................ H04R 1/02 381/345 |
| 2016/0249437 A1 | 8/2016 | Sun et al. |
| 2016/0323983 A1 | 11/2016 | Yotsumoto et al. |
| 2018/0190285 A1* | 7/2018 | Heckmann ......... H05K 7/20009 |

FOREIGN PATENT DOCUMENTS

| | | |
|---|---|---|
| KR | 10-1711418 | 3/2017 |
| WO | WO 2014/194593 | 12/2014 |
| WO | WO 2016/135517 | 9/2016 |

OTHER PUBLICATIONS

Written Opinion dated Oct. 17, 2018 issued in counterpart application No. PCT/KR2018/007902, 4 pages.
European Search Report dated May 19, 2020 issued in counterpart application No. 18831946.1-1210, 10 pages.

* cited by examiner

ELECTRONIC DEVICE WITH HEAT RADIATION STRUCTURE USING AUDIO DEVICE

CROSS-REFERENCE TO RELATED APPLICATION(S)

This application is based on and claims priority under 35 U.S.C. § 119 to Korean Patent Application No. 10-2017-0088488, filed on Jul. 12, 2017, in the Korean Intellectual Property Office, the disclosure of which is incorporated herein by reference in its entirety.

BACKGROUND

1. Field

The present disclosure relates to an electronic device, and more particularly, to an electronic device including a heat emission device.

2. Description of the Related Art

As electronic devices carried by individual users, such as mobile terminals, have become popular, various communication protocols have been implemented. For example, electronic devices are equipped with various functions for increasing user convenience, such as connectivity to a commercial communication network, connectivity to the Internet via a personal (wired/wireless) local area network (LAN), and user authentication, contactless card payment (i.e., magnetic secure transmission (MST)), or wireless charging by near field communication (NFC).

In general, an electronic device operates by a user command input by an input device, such as keys or a touch screen. Recently, electronic devices which select and execute functions in response to a user's voice command have been proposed, and functions executed according to an embedded algorithm based on information sensed through various sensors have also been proposed. For example, an electronic device may activate/deactivate a display device or control the brightness of the display device according to information sensed through a proximity sensor or an illumination sensor. In the case of a closed-circuit camera, a recording mode may be changed according to information sensed through a motion sensor.

As electronic devices are used more and more frequently, and are equipped with additional various functions, electronic devices face the potential for performance degradation caused by heat emission. For example, an illumination or flashlight module, a constantly active closed-circuit camera, and a wired/wireless charging module each generate a certain amount of heat during operation, thereby substantially decreasing energy efficiency in the electronic device. The heat generated in an electronic device may degrade the operation performance of an integrated circuit (IC) chip (i.e., a processor or a communication module) within the electronic device.

SUMMARY

Embodiments of the present disclosure address at least the above-mentioned problems and/or disadvantages and provide at least the advantages described below.

In accordance with an aspect of the present disclosure, an electronic device is provided for preventing the degradation of operation performance caused by heat emission by forming a heat radiation structure with an audio device of the electronic device.

In accordance with another aspect of the present disclosure, an electronic device is provided with a simplified structure that prevents operation performance degradation caused by heat emission without an additional heat radiation structure.

In accordance with another aspect of the present disclosure a heat radiation structure is provided that includes a sound reflection plate for radiating heat in a predetermined direction, and an electronic device for efficiently radiating heat generated from a heat emission device through the sound reflection plate.

According to an embodiment, an electronic device includes a first housing, a speaker module disposed on a surface of the first housing and configured to output sounds in a first direction, a sound reflection plate mounted above the surface of the first housing and having a first surface facing the speaker module, and a heat emission device disposed on a second surface of the sound reflection plate. The sound reflection plate may absorb heat generated from the heat emission device, and discharge the absorbed heat to the outside through a space between the surface of the first housing and the first surface of the sound reflection plate.

In accordance with another embodiment, an electronic device includes a first housing, a circuit board accommodated in the first housing including at least a processor and a communication module, a speaker module disposed on a surface of the first housing and configured to output sounds in a first direction, a sound reflection plate mounted above the surface of the first housing and having a first surface facing the speaker module, a second housing fabricated of a transparent or semi-transparent material and having one end engaged with the sound reflection plate, a microphone module engaged with the other end of the second housing opposite to the sound reflection plate, and an illumination module mounted on a second surface of the sound reflection plate. The processor may control at least one of the speaker module or the illumination module based on audio data received through the microphone module.

BRIEF DESCRIPTION OF THE DRAWINGS

The above and other aspects, features and advantages of certain embodiments will be more apparent from the following description taken in conjunction with the accompanying drawings, in which.

DETAILED DESCRIPTION

Embodiments of the present disclosure are described with reference to the accompanying drawings.

The present disclosure may include various modifications and may have a plurality of embodiments. Some embodiments are described in detail with reference to the accompanying drawings.

Terms including ordinal numbers such as "first" and "second" may be used to describe various corresponding components regardless of importance or order and are used to distinguish one component from another without limiting the components. For example, a first component may be referred to as a second component and vice versa without departing from the scope of the present disclosure. The expression "and/or" means a combination of or a plurality of related items.

Further, relative expressions such as "front surface", "rear surface", "top surface", and "bottom surface" as they are shown in the drawings may be replaced with ordinal terms such as "first surface" and "second surface". The sequence of the ordinal numbers such as "first" and "second" is determined as mentioned or arbitrarily, and thus may be changed freely when needed.

It is to be understood that a singular form may include plural forms, unless the context clearly dictates otherwise. In the present disclosure, the terms "have", "may have", "include", or "may include" signifies the presence of a specific feature, number, step, operation, component, part, or combination thereof, not excluding the presence of one or more other features, numbers, steps, operations, components, parts, or combinations thereof.

Unless otherwise defined, terms and words, including technical or scientific terms, used in the following description and claims may have the same meanings as generally understood by those skilled in the art. Terms as generally defined in dictionaries may be interpreted as having the same or similar meanings as contextual meanings of related technology. Unless otherwise defined, terms should not be interpreted with ideally or excessively formal meanings.

According to the present disclosure, an electronic device may be any device equipped with a touch panel, and may also be called a terminal, a portable terminal, a mobile terminal, a communication terminal, a portable communication terminal, a portable mobile terminal, or a display device.

For example, an electronic device may be a smart phone, a portable phone, a navigation device, a game console, a television (TV), an in-vehicle head unit, a laptop computer, a tablet computer, a portable multimedia player (PMP), or a personal digital assistant (PDA). An electronic device may be configured as a pocket-size portable communication terminal equipped with a wireless communication function. Further, an electronic device may be a flexible device or a flexible display device.

The electronic device may communicate with an external electronic device, such as a server, or perform a task through interaction with an external electronic device. For example, the electronic device may transmit an image captured by a camera and/or location information detected by a sensor unit to a server through a network. The network may be, but not limited to, a mobile or cellular communication network, an LAN, a wireless local area network (WLAN), a wide area network (WAN), the Internet, or a small area network (SAN).

Figure 1:
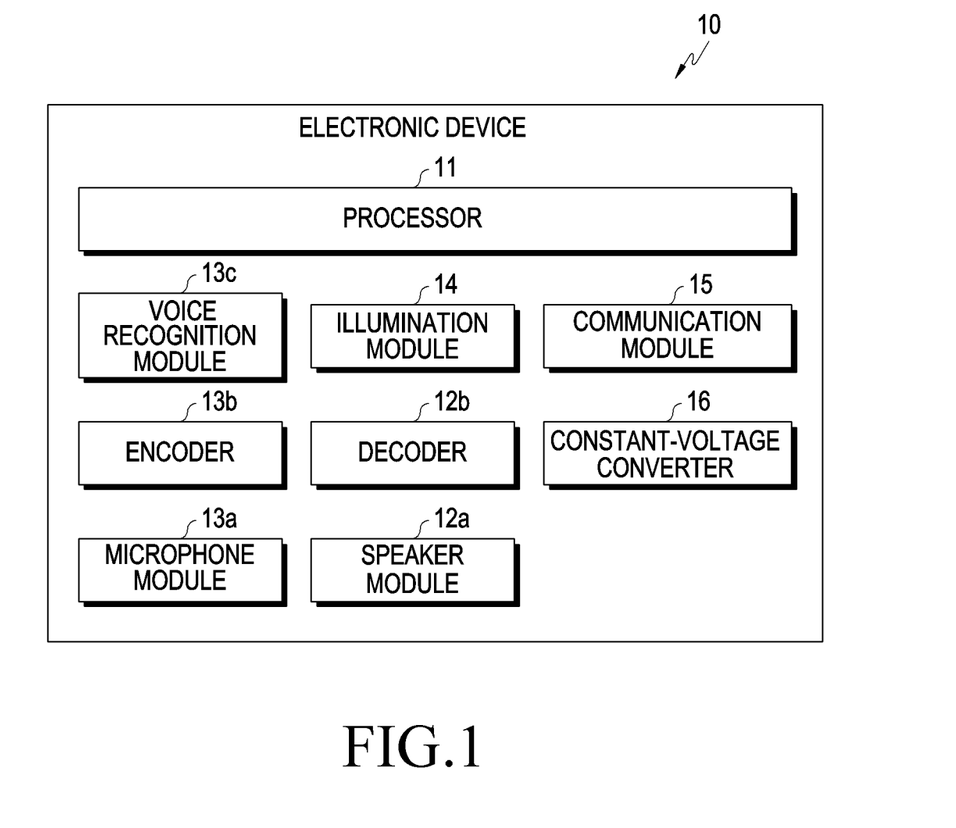
FIG. 1 is a block diagram illustrating an electronic device, according to an embodiment.

FIG. 1 is a block diagram illustrating an electronic device 10, according to an embodiment.

Referring to FIG. 1, the electronic device 10 may include the whole or part of an electronic device (for example, an electronic device 100 or 200 illustrated in FIG. 2 or FIG. 8, respectively) according to later-described embodiment(s). The electronic device 10 may include one or more processors (i.e., application processors (APs)) 11, a speaker module 12a, a microphone module 13a, an illumination module 14, and a communication module 15.

The processor 11 may control a plurality of hardware or software components connected to the processor 11 by operating an operating system (OS) or an application program, and may process various types of data and perform computations. The processor 11 may be configured as a system on chip (SoC). The processor 11 may include at least a part (i.e., the communication module 15) of the components illustrated in FIG. 1. The processor 11 may control at least one of the speaker module 12a or the illumination module 14 based on externally input data, such as audio data received through the microphone module 13a.

According to an embodiment, the processor 11 may control at least one of the speaker module 12a or the illumination module 14 based on data received through the communication module 15. In another embodiment, the processor 11 may receive audio data through the microphone module 13a and transmit the received audio data through the communication module 15.

The electronic device 10 may further include a memory or a storage medium, and the processor 11 may load a command or data received from another component in a volatile memory and process the command or data, or may store the command or data in a non-volatile memory.

The speaker module 12a, which has, for example, a voice coil motor structure or a piezoelectric structure, may generate sounds in response to reception of an electrical signal. The electronic device 10 may further include a decoder 12b, and the decoder 12b may convert an electrical signal (i.e., a digital signal) received from the processor 11 to an analog signal, and provide or apply the analog signal to the speaker module 12a.

The microphone module 13a may generate an electrical signal by detecting sounds generated in the surroundings and provide the electrical signal to the processor 11. The electronic device 10 may further include an encoder 13b, and the encoder 13b may convert an electrical signal (i.e., an analog signal) generated from the microphone module 13a to a digital signal and provide the digital signal to the processor 11. As described above, the processor 11 may control the speaker module 12a or the illumination module 14 based on data received through the microphone module 13a (i.e., a digital signal received through the encoder 13b), or transmit data received through the communication module 15 to the outside.

The electronic device 10 may further include a voice recognition module 13c that may classify a user's voice among data received through the microphone module 13a and detect trigger information related to a command for performing an operation of the electronic device 10 in the user's voice. For example, the electronic device 10 may execute a function corresponding to a user's voice command.

Two or more of the decoder 12b, the encoder 13b, and the voice recognition module 13c may be integrated into one IC chip. In some embodiments, function(s) executed by the decoder 12*b*, the encoder 13*b*, and the voice recognition module 13*c* may be incorporated in a part of the functions of an audio module.

The illumination module 14 may include at least one light emitting element (i.e., a light emitting diode (LED)). The illumination module 14 may provide general indoor lighting, or lighting in a flicker pattern/color switching pattern which is regularly repeated or irregular according to an operation of the electronic device under the control of the processor 11. In some embodiments, the illumination module 14 may include a plurality of light emitting elements, and provide lighting in various colors and patterns according to the operations of respective light emitting elements.

The communication module 15 may include a cellular module, a wireless fidelity (WiFi) module, a Bluetooth module, a global navigation satellite system (GNSS) module (i.e., a global positioning system (GPS) module, a global orbiting navigation satellite system (Glonass) module, a Beidou module, or a Galileo module), an NFC module, and a radio frequency (RF) module. The communication module 15 may provide voice calls, video calls, short-range wireless communication, and various Internet services by transmitting information generated by the processor 11 to the outside and transmitting information received from the outside to the processor 11.

The electronic device 10 may further include a constant-voltage converter 16 that receives external power, converts the received power to a voltage and current suitable for each of the components (i.e., the processor 11) of the electronic device 10, and applies the voltage and current to the component. In some embodiments, the constant-voltage converter 16 may be included in a housing provided separately from a first housing 101, and may supply power to other components accommodated in the first housing 101 via a cable.

The electronic device 10 may also include at least one of a display device, a camera module, or an electromagnetic induction coil. In some embodiments, a processor 11, an illumination module 14, a display device, a camera module, or an electromagnetic induction coil may be heat emission devices which generate heat during operation.

Figure 2:
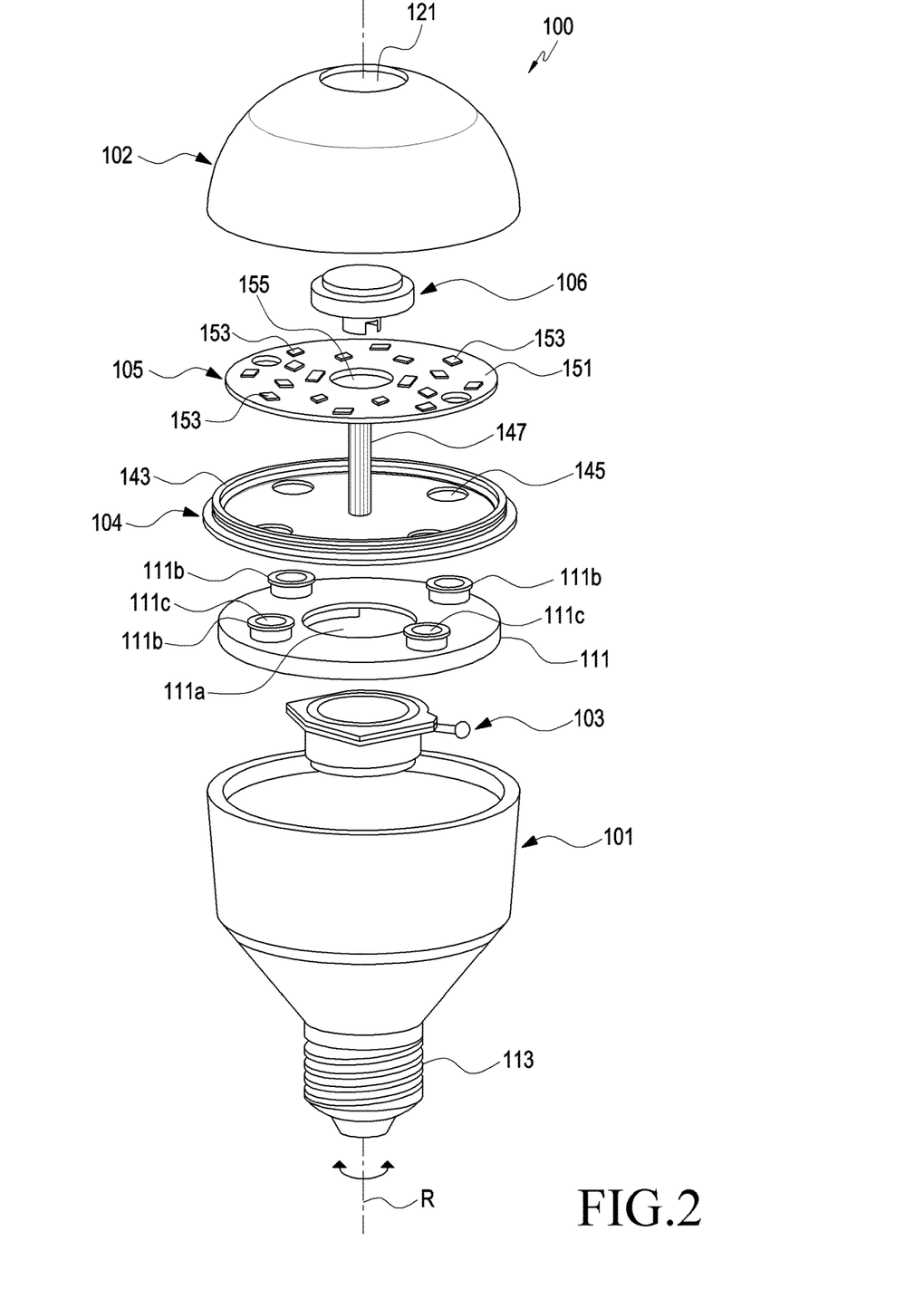
FIG. 2 is an exploded perspective view illustrating an electronic device, according to an embodiment.

According to an embodiment, heat generated from a heat emission device may be discharged to the outside without installing an additional heat radiation structure or device. For example, an electronic device may utilize a structure in an audio device or an audio guiding (i.e., audio radiating) structure as a heat radiation structure so as to simplify the structure of the electronic device and prevent performance degradation caused by heat emission from internal parts. With reference to FIG. 2, the configuration of this type of electronic device will be described in greater detail.

Figure 3:
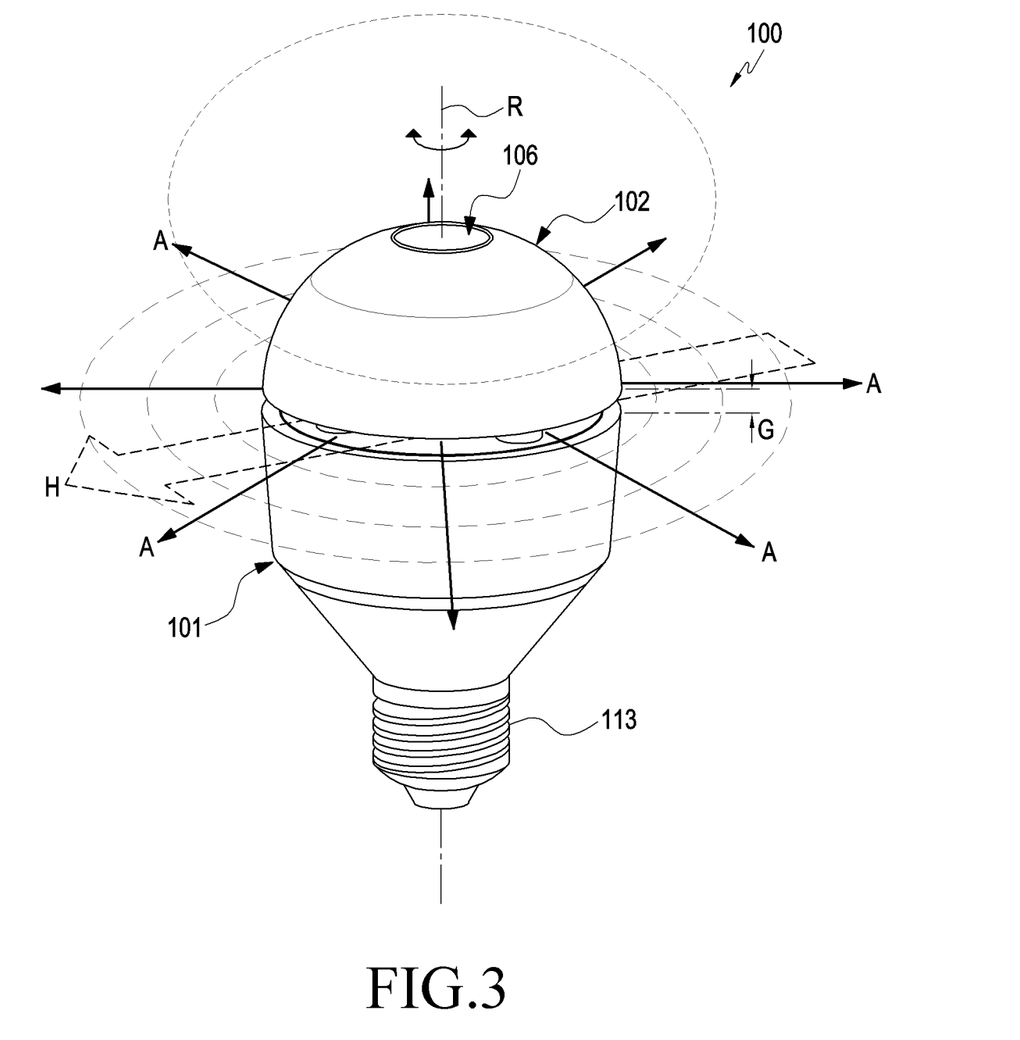
FIG. 3 is a perspective view illustrating an electronic device, according to an embodiment.

FIG. 2 is an exploded perspective view illustrating an electronic device 100, according to an embodiment, and FIG. 3 is a perspective view illustrating the electronic device 100, according to an embodiment.

Referring to FIGS. 2 and 3, the electronic device 100 may include the first housing 101, a speaker module 103, a sound reflection plate 104, and/or a heat emission device 105. The sound reflection plate 104 may be mounted apart from the speaker module 103, and the first housing 101, and may absorb heat generated from the heat emission device 105 and discharge the absorbed heat to the outside of the electronic device 100. For example, the sound reflection plate 104 may be fabricated of a heat-conductive metal (i.e., copper) or synthetic resin (i.e., heat-conductive silicon), to thereby absorb heat generated from the heat emission device 105 and discharge the absorbed heat to the outside through a space (or gap) G between the first housing 101 and one surface of the sound reflection plate 104.

Figure 4:
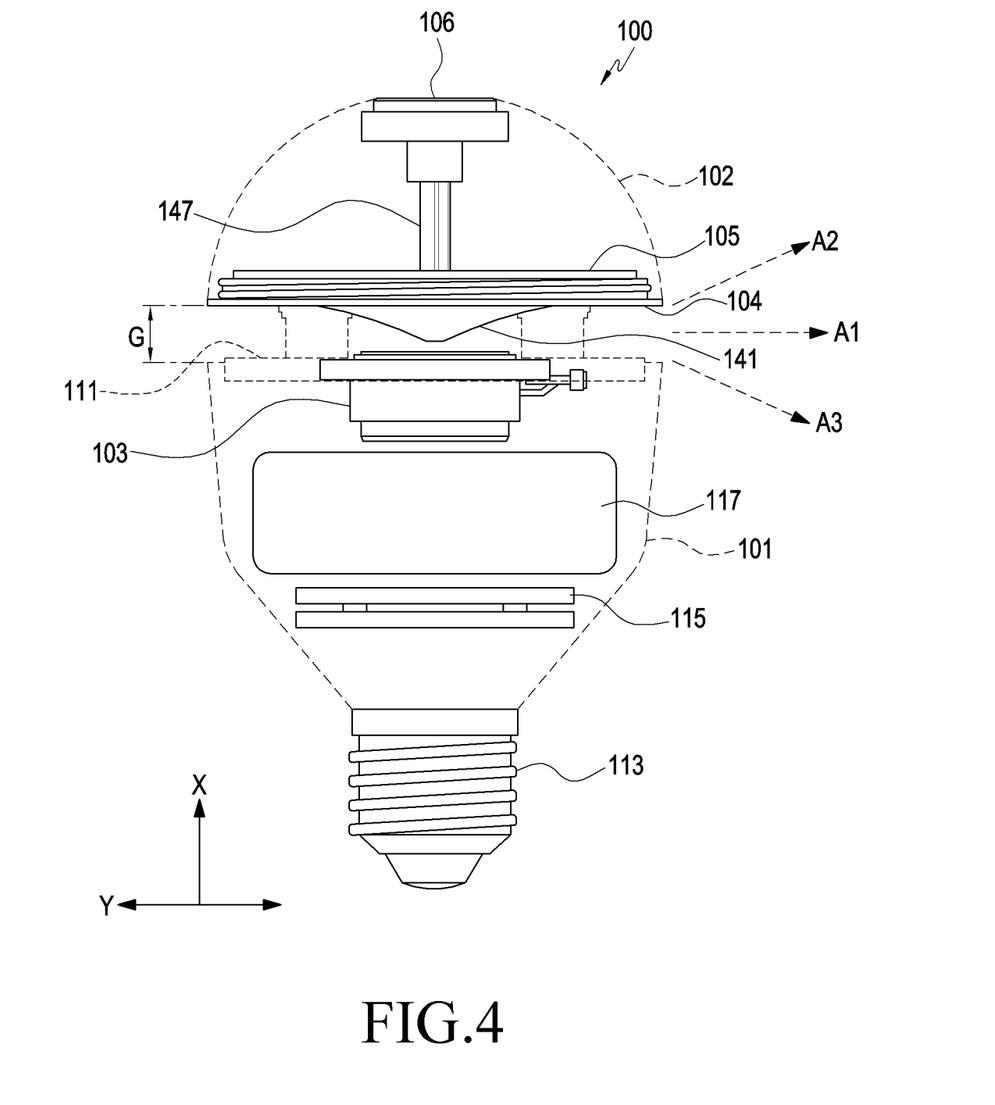
FIG. 4 is an internal perspective view illustrating an internal structure of an electronic device, according to an embodiment.

The first housing 101 is cylindrical on the whole, and may include a housing cap 111 which is mounted on one surface (i.e., a top surface) thereof so that the housing cap 111 may be directed in a first direction (i.e., a first direction X in FIG. 4). The first housing 101 may be fabricated of various materials in various shapes in consideration of an outward design or operation environment thereof. For example, if the electronic device 100 is a typical lighting device that provides indoor lighting, the first housing 101 may be shaped to be a part of a lighting bulb. As described later with reference to FIG. 4, the first housing 101 may accommodate a circuit board including at least a processor 11 and a communication module 15, or a constant-voltage converter 16.

The first housing 101 may further include a bulb base 113 which is disposed opposite to the housing cap 111. The bulb base 113 may couple the electronic device 100 to an external power source (i.e., a light bulb socket), and if the electronic device 100 includes an illumination module, the electronic device 100 may be used as a lighting device. The bulb base 113 may be formed into various shapes, such as a screw base, a twist and lock base, a pin base, and a plug-in lamp base. As shown in FIGS. 2-3, the bulb base 113 is a screw base, by way of example.

The speaker module 103 may be disposed opposite to the bulb base 113 on one surface of the first housing 101. For example, the speaker module 103 may be accommodated inside the first housing 101, while the speaker module 103 is mounted to the housing cap 111. According to an embodiment, the housing cap 111 may include a radiation hole 111*a*, and output sounds to the outside of the first housing 101 through the radiation hole 111*a* along the first direction X (i.e., a first direction X in FIG. 4). According to another embodiment, at least a part of the speaker module 103 may be disposed inside the radiation hole 111*a*.

The sound reflection plate 104 may be shaped, as a whole, in correspondence with the surface of the first housing 101, and may be mounted above the surface of the first housing 101, with one surface (i.e., a first surface 141 shown in FIGS. 4, 5 and 6) of the sound reflection plate 104 facing the speaker module 103. Herein, "installed above the surface of the first housing 101" may mean "fixed at a position apart from the surface of the first housing 101 by a predetermined gap or at a predetermined height above the one surface of the first housing 101". Since the sound reflection plate 104 is fixed at a predetermined height above the surface of the housing 101, the space G may be defined between the first housing 101 and the sound reflection plate 104.

Sounds output from the speaker module 103 may be reflected from the first surface 141 of the sound reflection plate 104, and radiated to the outside of the electronic device 100 through the space G. The first surface 141 of the sound reflection plate 104 may have various shapes according to a direction in which sounds are to be radiated. For example, the first surface 141 of the sound reflection plate 104 may protrude in the form of a cone, the center of which corresponding to the speaker module 103, and sounds output from the speaker module 103 may be reflected from the sound reflection plate 104 (i.e., the first surface 141) and then radiate omni-directionally (i.e., in all directions about a 360-degree range) from a plane perpendicular to the first direction X (i.e., a first direction X in FIG. 4). Although it has been described that sounds "radiate omni-directionally from the plane perpendicular to the first direction X", the sounds may radiate in a tilted direction with respect to the first direction X or a plane perpendicular to the first direction X.

The above-described reflection direction or radiation direction of sounds may be designed in various manners according to the profile of the first surface 141 of the sound reflection plate 104 and/or an installation environment of the electronic device 100. For example, while the space G is shown in FIG. 3 as having a uniform height on the whole along the overall periphery of the first housing 101, a left side of the space G may be designed and formed to be higher than a right side of the space G. If the space G is higher at the left side than at the right side, the first surface 141 of the sound reflection plate 104 may be shaped such that output sounds may be reflected to the left of the first housing 101.

The sound reflection plate 104 may be fabricated of a heat-conductive material. For example, if a part of an area or space in which the sound reflection plate 104 is disposed has a higher temperature, the sound reflection plate 104 may absorb heat from that part and transfer the absorbed heat to another part. The heat emission device 105 may be mounted on a second surface of the sound reflection plate 104, and heat generated from the heat emission device 105 may be absorbed by the sound reflection plate 104 and discharged to the first surface 141 of the sound reflection plate 104, for example, the space G.

The electronic device 100 may further include at least one mounting post 111b, thereby forming the space G. A plurality of mounting posts 111b may be extended in the first direction X (i.e., a first direction X in FIG. 4) from the housing cap 111, thereby forming the space G. As described above, the space G may be used as a path in which sounds or heat is transferred and discharged.

The heat emission device 105 may include an illumination module 14. Additionally or alternatively, the heat emission device 105 may include a processor 11, a display device, a camera module, and an electromagnetic induction coil. For example, the electronic device 100 may be configured as a display device (i.e., a beam projector), a camera device (i.e., a closed-loop camera), or a charger (i.e., a wireless charger).

The heat emission device 105 may include a plurality of light emitting elements, for example, LEDs 153 on a substrate 151. The LEDs 153 may generate heat, while outputting light. As a result, the energy efficiency or luminance of the LEDs 153 may be decreased. The sound reflection plate 104 may prevent the decrease of the energy efficiency or luminance of the LEDs 153 by absorbing heat generated from the heat emission device 105 (i.e., the LEDs 153) and discharging the absorbed heat to the outside.

According to an embodiment, the electronic device 100 may further include a second housing 102 and a microphone module 106.

The second housing 102 is used for accommodating, for example, the heat emission device 105. If the heat emission device 105 includes an illumination module, the second housing 102 may be fabricated of a transparent or semi-transparent material (i.e., glass or synthetic resin). The sound reflection plate 104 may be engaged with one end of the second housing 102, thereby positioning the heat emission device 105 inside the second housing 102. For example, the heat emission device 105 may be accommodated in a space surrounded by the sound reflection plate 104 and the second housing 102.

According to an embodiment, the sound reflection plate 104 may include an engagement rib 143 extended along the periphery of a second surface of the sound reflection plate 104, and the engagement rib 143 may be engaged with the inner surface of the one end of the second housing 102. Screw threads may be formed on the outer circumferential surface of the engagement rib 143 so that the engagement rib 143 may be fixedly engaged with the inner surface of the second housing 102.

The microphone module 106 may be engaged with the other end of the second housing 102, and thus disposed opposite to the sound reflection plate 104. The microphone module 106 may be fixed inside the second housing 102 and exposed outward through a sound hole 121 formed in the second housing 102. The microphone module 106 may receive and detect sounds generated in the surroundings of the second housing 102 and/or the electronic device 100.

According to embodiments, the electronic device 100 may control the speaker module 103 and/or the heat emission device 105 based on information (i.e., audio information) received through the microphone module 106. Various control operations based on received information may be used in relation to the operations of the processor 11 illustrated in FIG. 1.

According to an embodiment, if the electronic device 100 has a screw bulb structure, the bulb base 113 provided in the first housing 101 is a screw base, the microphone module 106 may be disposed on a rotation axis R of the bulb base 113 and/or the first housing 101. Further, if the microphone module 106 is mounted out of the rotation axis R, the microphone module 106 may be directed in a different direction according to the degree of rotation of the electronic device 100 or the first housing 101. The microphone module 106 may receive or capture audio information generated in the surroundings under the same conditions according to the disposition of the microphone module on the rotation axis R, irrespective of the installation state or rotation degree of the electronic device 100 or the first hosing 101.

According to an embodiment, as the electronic device 100 further includes a connection post 147, the microphone module 106 may be stably mounted and fixed. The connection post 147 may be extended from the sound reflection plate 104, and the microphone module 106 may be engaged with an end portion of the connection post 147. For example, the microphone module 106 may be fixed between the connection post 147 and an inner wall of the other end of the second housing 102. According to an embodiment, as the heat emission device 105 (i.e., the substrate 151) includes a hole 155 through which the connection post 147 passes, the substrate 151 may be mounted on the other surface of the sound reflection plate 104 without interference with the connection post 147.

The electronic device 100 may include wiring structures of various shapes between the first housing 101 and the second housing 102 and/or inside the second housing 102. For example, the electronic device 100 may include an electrical connection path running from the bulb base 113 to the heat emission device 105 and/or the microphone module 106 (via a circuit board or a constant-voltage converter included in the first housing 101).

The inner space of the first housing 101 and the inner space of the second housing 102 may communicate with each other via wiring holes 111c formed in mounting posts 111b. The wiring holes 111c may be formed to pass from the inner surface of the housing cap 111 through end portions of the mounting posts 111b. According to an embodiment, the sound reflection plate 104 may include through holes 145 corresponding to the wiring holes 111c. For example, the inner space of the first housing 101 may communicate with the inner space of the second housing 102 via the wiring holes 111c and/or the through holes 145.

According to an embodiment, the connection post 147 may include a slit or clip for fixing a wire, a flexible printed circuit board, or a ribbon cable. For example, wires extended from the first housing 101 (or the circuit board included in the first housing 101) may be disposed in the second housing 102 via the wiring holes 111*c*, and a part of the wires disposed inside the second housing 102 may be connected to the microphone module 106, or fixed on the connection post 147.

The speaker module 103 may be controlled or information received from the microphone module 106 may be converted and transferred, through the decoder 12*b*, encoder 13*b*, and voice recognition module 13*c*, illustrated in FIG. 1. Further, a control signal may be generated or information may be received and/or processed by the above-mentioned processor 11 illustrated in FIG. 1. According to an embodiment, the microphone module 106 may receive a user's voice command, and the processor 11 may control the speaker module 103 or the heat emission device 105 (i.e., an illumination module 14) according to the received voice command. For example, upon receipt of a voice command related to reproduction of a music file, the processor 11 may reproduce a stored music file. According to another embodiment, if a user-intended music file is not preserved, the processor 11 may request, receive, and reproduce the music file by communicating with an external server through the communication module 15. While a music file or externally received information is reproduced as sounds through the speaker module 103, the processor 11 may provide various visual effects by controlling the heat emission device 105 (i.e., the illumination module 14). These visual effects may be realized by changing a flicker pattern or color pattern of lighting.

Figure 5:
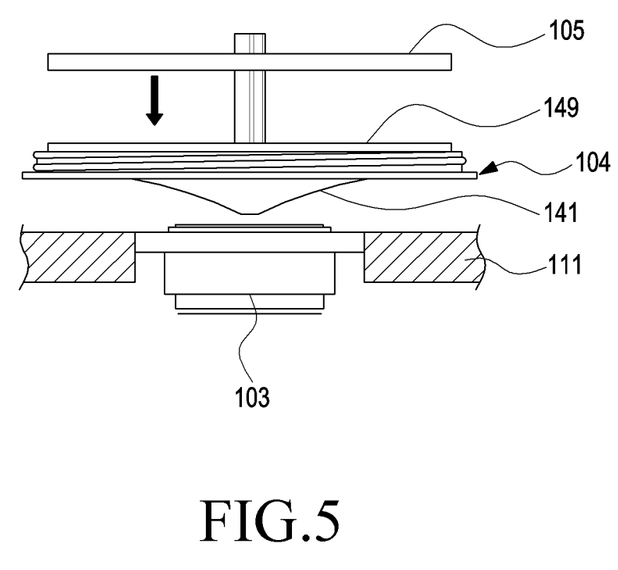
FIG. 5 is a side view illustrating the structure of a part of an electronic device, according to an embodiment.

FIG. 4 is an internal perspective view illustrating an internal structure of the electronic device 100, according to an embodiment, and FIG. 5 is a side view illustrating the structure of a part of the electronic device 100, according to an embodiment.

Referring to FIGS. 4 and 5, the electronic device 100 may include a circuit board 115 and a constant-voltage converter 117 inside the first housing 101. The circuit board 115 may include, for example, the processor 11, the communication module 15, the decoder 12*b*, the encoder 13*b*, and the voice recognition module 13.

According to an embodiment, the electronic device 100 may further include an ultraviolet sensor, an illumination sensor, and a temperature/humidity sensor, in order to detect an operation environment of the electronic device 100. Information detected through the above sensors may be provided to the processor 11, and the processor 11 may perform an operation such as control of the brightness of lighting based on the received information.

The sound reflection plate 104 may be disposed apart from one surface of the first housing 101, facing the speaker module 103. The speaker module 103 may output sounds in the first direction X, and the outputted sounds may radiate to the outside through the space G between the surface of the first housing 101 and a first surface of the sound reflection plate 104, as indicated by reference numerals A1, A2, and A3. For example, the sound reflection plate 104 may reflect output sounds, and guide and radiate the reflected sounds to the outside of the electronic device 100 at least along a second direction Y (and/or from a plane perpendicular to the first direction X). Herein, the second direction Y may include a direction perpendicular to the first direction X.

Sounds may radiate to the outside in various directions according to the profile of a first surface of the sound reflection plate 104. For example, the first surface 141 of the sound reflection plate 104 illustrated in FIG. 4 and/or FIG. 5 may be shaped substantially into a cone at the center of the sound reflection plate 104, and sounds output from the speaker module 103 may radiate omni-directionally from the plane perpendicular to the first direction X based on the cone shape. In some embodiments, if the first surface of the sound reflection plate 104 is a tilted plane, sounds output from the electronic device 100 (i.e., through the speaker module 103) may concentrate in a direction in which the tilted surface faces (a reflection direction of the sounds). For example, the profile of the first surface of the sound reflection plate 104 may be designed appropriately, according to an environment in which the electronic device 100 is installed.

The sound reflection plate 104 may be fabricated of a heat-conductive material, such as a metal such as copper, or a synthetic resin such as heat-conductive silicon. The heat emission device 105 (i.e., an illumination module 14) may be mounted on a second surface of the sound reflection plate 104, and heat generated from the heat emission device 105 may be discharged to the outside of the second housing 102 through the space between the surface of the first housing 101 and the first surface of the sound reflection plate 104. As the space G is opened substantially to enable circulation of external air of the electronic device 100, the space G may be used as a heat radiation structure as well as to provide a sound radiation path.

In mounting the heat emission device 105 on the sound reflection plate 104, the electronic device 100 may further include a heat transfer member 149. The heat transfer member 149 may be interposed between the heat emission device 105 and the sound reflection plate 104, thereby providing an electrical insulation function, and may transfer heat generated from the heat emission device 105 to the sound reflection plate 104. The heat transfer member 149 may be, for example, a tape formed of synthetic resin such as heat-conductive silicon, an adhesive, or a sponge. According to an embodiment, thermal grease may be coated between the heat emission device 105 and the sound reflection plate 104, between the heat emission device 105 and the heat transfer member 149, and/or between the heat transfer member 149 and the sound reflection plate 104. The thermal grease may increase heat transfer efficiency between the heat emission device 105 and the sound reflection plate 104.

Figure 6:
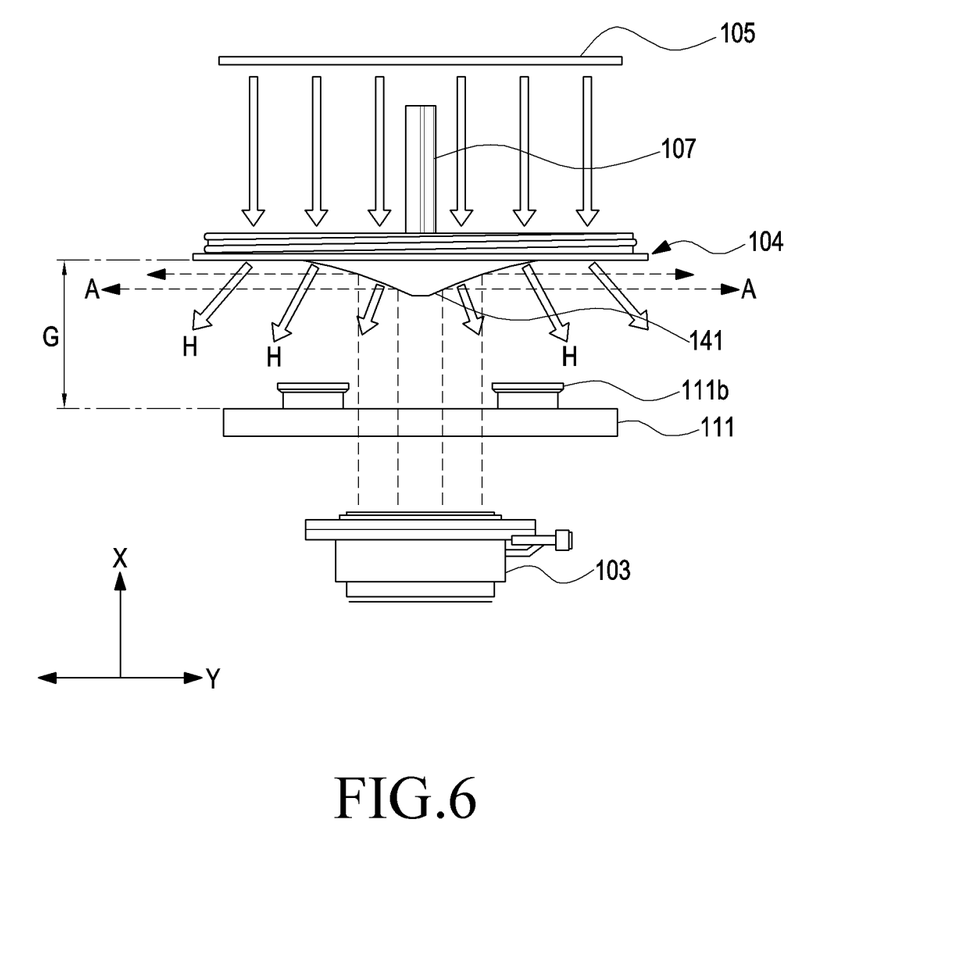
FIG. 6 is a view illustrating an operation of an electronic device, according to an embodiment.

FIG. 6 is a view illustrating an operation of the electronic device 100, according to an embodiment.

While the speaker module 103 or the heat emission device 105 is shown as configured separately in FIG. 6, this is merely intended to describe a sound or heat transfer path, and other configurations are possible. The speaker module 103 may be mounted in the housing cap 111, and the heat emission device 105 may be mounted on the sound reflection plate 104 (and/or the heat transfer member 149).

Referring to FIG. 6, sounds output from the speaker module 103 may be reflected by the sound reflection plate 104 and radiate to the outside through the space G. Heat generated from the heat emission device 105 may be absorbed by the sound reflection plate 104 and then discharged to the outside through the space G. Since the space G substantially communicates with an external space of the above-described electronic device 100, external air may circulate inside the space G, heat generated from the heat emission device 105 may be discharged fast to the outside of the electronic device 100. Since output of sounds from the speaker module 103 substantially induces vibration or circulation of air, discharge of heat generated from the heat emission device 105 may be accelerated.

According to an embodiment, the speaker module 103 may be inoperative during operation of the heat emission device 105 (i.e., during lighting of the illumination module 14). For example, although lighting may always be provided, the speaker module 103 may operate according to a user command or request. Upon receipt of a user command, if a predetermined condition is satisfied in spite of the absence of a user command, or every predetermined interval, the electronic device 100 (i.e., the processor 11) may operate the speaker module 103. For example, if an internal temperature of the electronic device 100 reaches a predetermined temperature due to operation of the heat emission device 105, the electronic device 100 may accelerate heat discharge by operating the speaker module 103. When the speaker module 103 operates, vibration of the speaker module 103 may form an air flow in a space between the sound reflection plate 104 and the speaker module 103 (i.e., the space G), and this air flow may accelerate discharge of heat generated from the electronic device 100. The internal temperature of the electronic device 100 may be sensed through a sensor (i.e., a temperature/humidity sensor) included in the electronic device 100.

According to an embodiment, if the internal temperature of the electronic device 100 reaches the predetermined temperature, the electronic device 100 may deactivate the heat emission device 105 or lower the output of the heat emission device 105 (i.e., luminance if the heat emission device 105 is an illumination module 14). According to an embodiment, if operation of the heat emission device 105 is controlled without a user command or request, the electronic device 100 (i.e., the processor 11) may notify this control (i.e., output a voice notification) through the speaker module 103.

Figure 7:
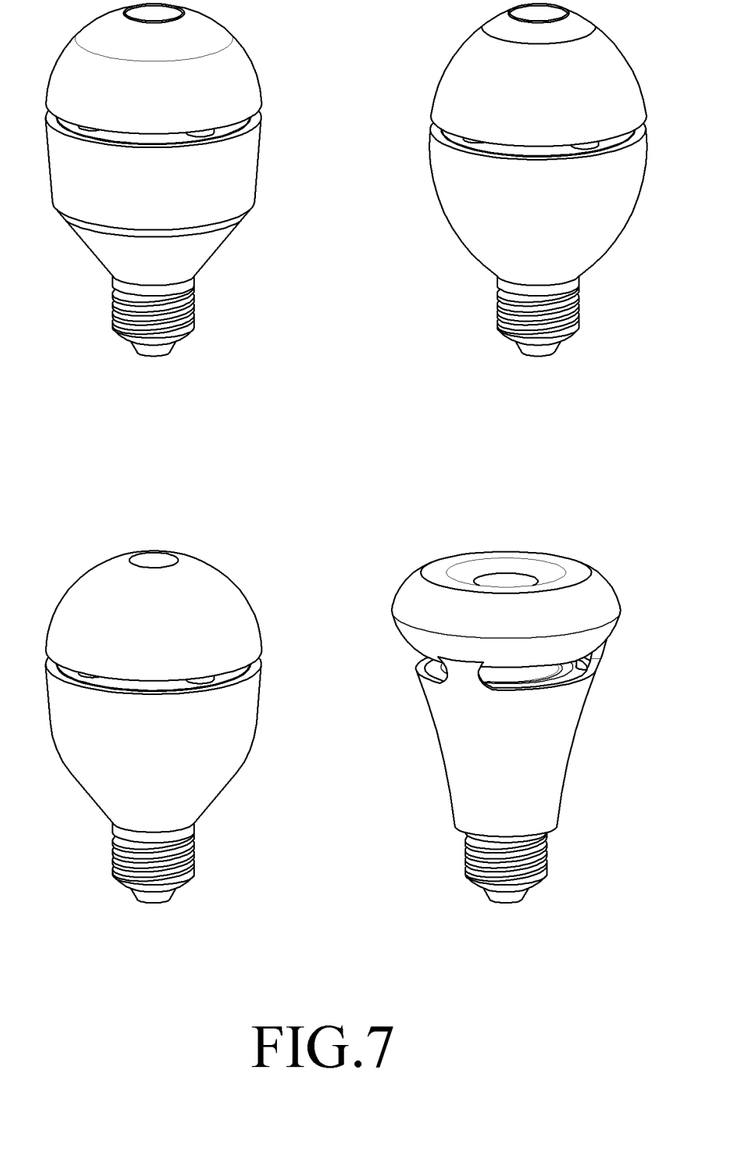
FIG. 7 is a view illustrating examples of an electronic device, according to various embodiments.

FIG. 7 is a view illustrating various modification examples of an electronic device, according to an embodiment.

As illustrated in FIG. 7, an electronic device may be fabricated in various shapes in consideration of an installation environment, and a consumer may select and purchase an electronic device of an intended shape.

Figure 8:
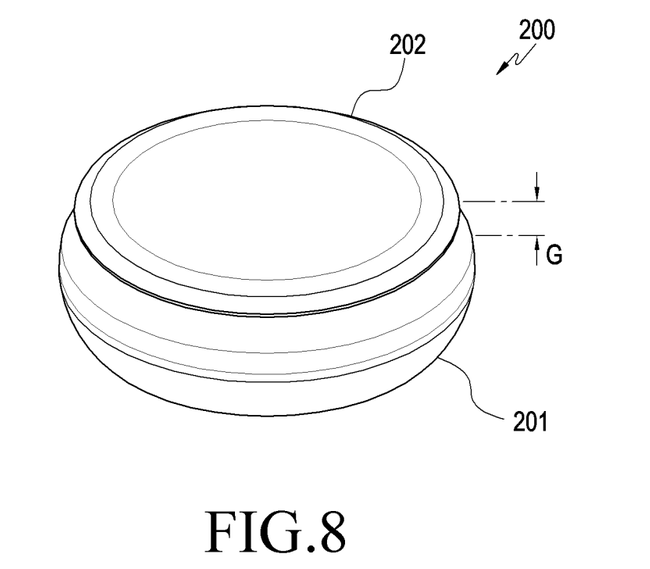
FIG. 8 is a perspective view illustrating an electronic device, according to an embodiment.
Figure 9:
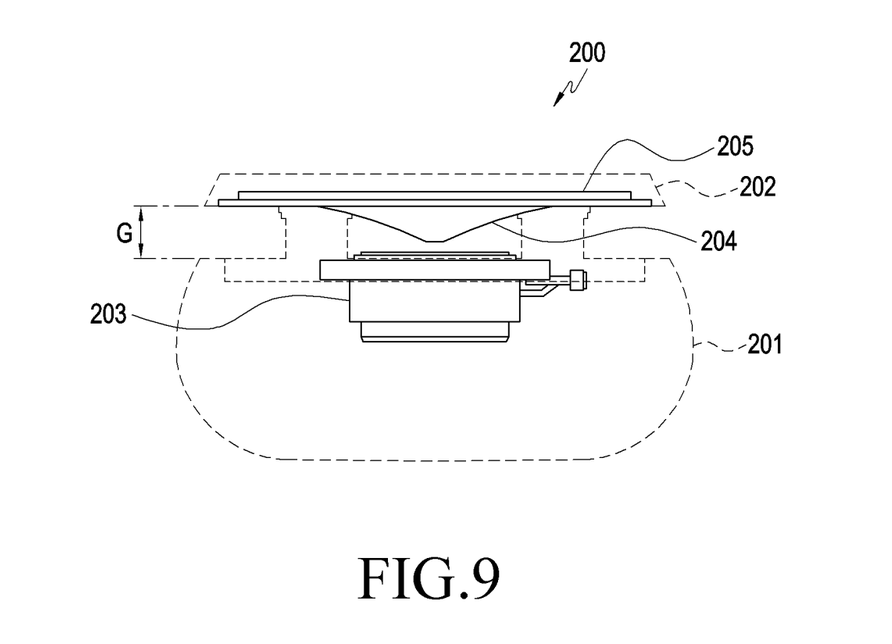
FIG. 9 is an internal perspective view illustrating an electronic device, according to an embodiment.

FIG. 8 is a perspective view illustrating an electronic device 200, according to an embodiment, and FIG. 9 is an internal perspective view illustrating the electronic device 200, according to an embodiment.

In FIGS. 8 and 9, the electronic device 200 may include an electromagnetic induction coil 205 as a heat emission device. According to an embodiment, the electronic device 200 may transmit power wirelessly by forming an electromagnetic field through the electromagnetic induction coil 205. For example, if a secondary coil is mounted in another electronic device such as a mobile communication terminal, the other electronic device may receive charging power for an internal battery by being placed in the electromagnetic field formed by the electronic device 200.

Referring to FIGS. 8 and 9, the electronic device 200 may include a first housing 201 having a speaker module 203 included on a surface thereof, and a sound reflection plate 204 mounted above the surface (i.e., the top surface) of the first housing 201. The electronic device 200 may include a second housing 202 above the first housing 201, and the sound reflection plate 204 may form a part (i.e., a bottom surface) of the second housing 202. The second housing 202 may be mounted above the first housing 201, apart from the one surface of the first housing 201. Sounds output from the speaker module 203 may be reflected from one surface of the sound reflection plate 204 and discharged to the outside through a space G between the first housing 201 and the second housing 202.

According to an embodiment, a heat emission device (i.e., the electromagnetic induction coil 205) may be mounted inside the second housing 202. The electronic device 200 may generate an electromagnetic field through the electromagnetic induction coil 205 by receiving power. According to an embodiment, the electronic device 200 may be connected to an external power source by a cable and supply power to the electromagnetic induction coil 205 through an included power management module (i.e., the constant-voltage converter 16.

The electromagnetic induction coil 205 may generate heat during formation of the electromagnetic field, and the heat may increase the electric resistance of the electromagnetic induction coil 205, thereby causing the decrease of energy efficiency. According to an embodiment, the electromagnetic induction coil 205 may be mounted on the sound reflection plate 204, and the sound reflection plate 204 may absorb heat generated from the electromagnetic induction coil 205 and discharge the absorbed heat to the outside of the second housing 202 (i.e., the space G). According an embodiment, the electronic device 200 may further include a heat transfer member 149 in order to accelerate heat absorption of the sound reflection plate 204.

The speaker module 203 may induce air vibration or circulation in the space G by outputting sounds. For example, as the speaker module 203 operates, external air may circulate into the space G more actively, and the air circulation in the space G may lead to faster discharge of heat absorbed by the sound reflection plate 204 to the outside.

Figure 10:
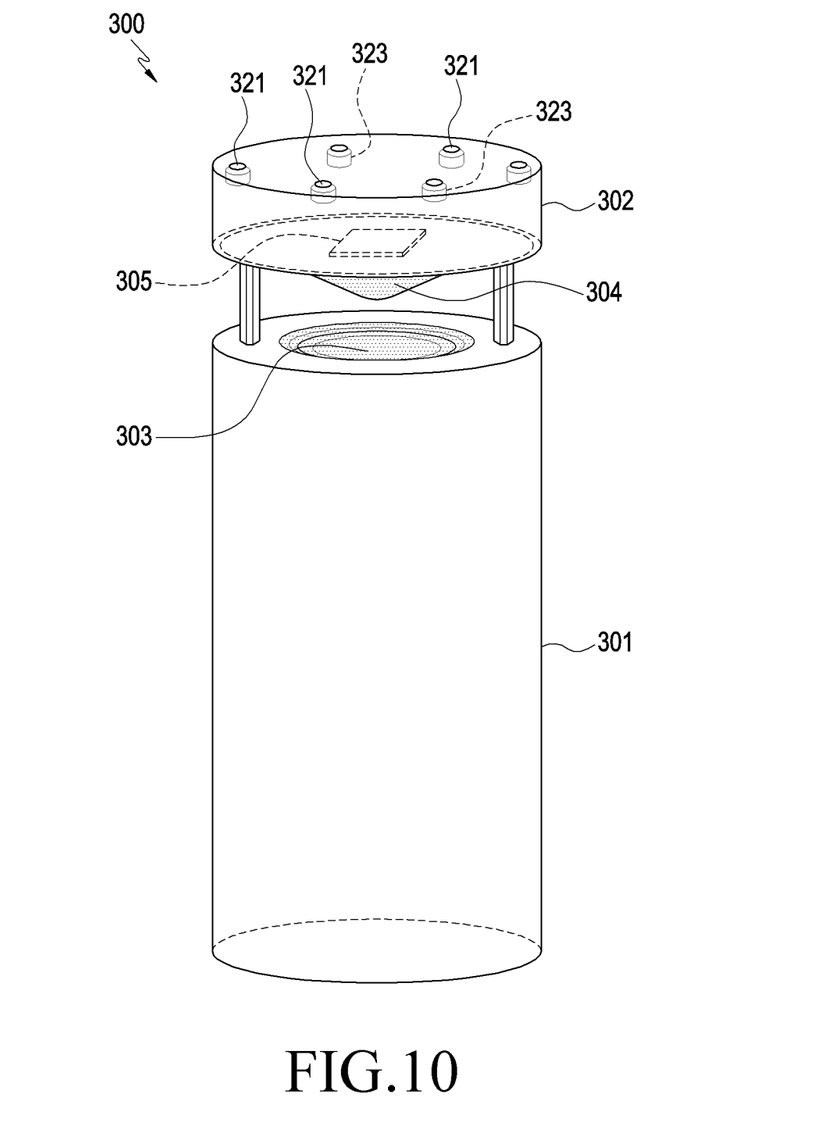
FIG. 10 is a perspective view illustrating an electronic device, according to an embodiment.

FIG. 10 is a perspective view illustrating an electronic device 300, according to an embodiment.

Referring to FIG. 10, the electronic device 300 may include a first housing 301 having a speaker module 303 mounted on a surface (i.e., the top surface) thereof, and a sound reflection plate 304 mounted above the surface of the first housing 301. The electronic device 300 may include a second housing 302 above the first housing 301, and the sound reflection plate 304 may form a part (i.e., a bottom surface) of the second housing 302. The second housing 302 (i.e., the sound reflection plate 304) may be mounted above the first housing 301, apart from the surface of the first housing 301. Sounds output from the speaker module 303 may be reflected from, for example, a first surface of the sound reflection plate 304 and discharged to the outside (i.e., sideways from the first housing 301) through a space between the first housing 301 and the second housing 302.

The second housing 302 may include at least one microphone module of a plurality of microphone modules 323 and at least one hole of a plurality of holes 321 corresponding to each of the at least one microphone modules 323. For example, the holes 321 may provide paths in which external sounds are input to the respective microphone modules 323. According to an embodiment, the holes 321 are formed on the top surface of the second housing 302. Also, the holes 321 may be formed on a side surface of the second housing 302 or on both of the top and bottom surfaces of the second housing 302. The number and positions of the holes 321 may be modified in various manners in consideration of the shape of the electronic device 300, the position relationship between the holes 321 and the speaker module 303, and the installation environment of the electronic device 300.

According to an embodiment, an audio module 305 (i.e., a digital signal processor (DSP)) may be included in the second housing 302 in order to process an audio signal received through the heat emission device (i.e. the microphone modules 323). The electronic device 300, (i.e. the audio module 305) may perform a signal process such as noise suppression or reinforcement of an intended sound by combining audio signals received through a plurality of microphone modules 323. As more microphone modules 323 are installed in the second housing 302, the load of signal processing may increase, thereby causing the audio module 305 to generate heat. The heat generation of the audio module 305 may increase the energy consumption of the audio module 305 or degrade the operation performance of the audio module 305.

The audio module 305 and/or a circuit board on which the audio module 305 is mounted may be disposed near the sound reflection plate 304, and the sound reflection plate 304 may absorb heat generated from the audio module 305 and discharge the absorbed heat to the outside of the second housing 302 (i.e., the space between the first housing 301 and the second housing 302).

The electronic device 300 may further include a heat transfer member 149 in order to accelerate heat absorption of the sound reflection plate 304. The heat transfer member may be interposed between the heat emission device (i.e. the audio module 305) and the sound reflection plate 304 that provides a heat radiation function, or between the circuit board having the audio module 305 mounted thereon and the sound reflection plate 304.

As described above, the heat emission device may be components of many other shapes mounted in an electronic device, such as an optical system (i.e., a display device or a light emitting device) of a beam projector, or a camera module of a closed-circuit camera. Further, the heat emission device may be configured as an IC chip, such as a processor, and the speaker module may be disposed in the vicinity of the IC chip in order to induce air circulation.

As described above, an electronic device may include a first housing, a speaker module disposed on a surface of the first housing and configured to output sounds in a first direction, a sound reflection plate mounted above the surface of the first housing, and having a first surface facing the speaker module, and a heat emission device disposed on a second surface of the sound reflection plate. The sound reflection plate may absorb heat generated from the heat emission device, and discharge the absorbed heat to the outside through a space between the surface of the first housing and the first surface of the sound reflection plate.

The sound reflection plate may reflect sounds output from the speaker module, and radiate the reflected sounds through the space between the surface of the first housing and the first surface of the sound reflection plate.

The sound reflection plate may reflect sounds output from the speaker module, and radiate the reflected sounds in 360-degree directions at least from a plane perpendicular to the first direction.

The speaker module may output sounds in the first direction, and the sound reflection plate may reflect the sounds output from the speaker module in a tilted direction or a perpendicular direction with respect to the first direction.

The heat emission device may include at least one of an illumination module, a display device, a camera module, or an electromagnetic induction coil.

The electronic device may further include a bulb base disposed in the first housing, opposite to the speaker module.

The electronic device may further include a heat transfer member disposed between the heat emission device and the sound reflection plate.

The electronic device may further include a second housing fabricated of a transparent or semi-transparent material, and the sound reflection plate may be engaged with one end of the second housing.

The electronic device may further include a microphone module engaged with the other end of the second housing, opposite to the sound reflection plate.

The electronic device may further include a screw bulb base in the first housing, opposite to the speaker module, and the microphone module may be disposed on a rotational axis of the screw bulb base.

The electronic device may further include a connection post extended from the second surface of the sound reflection plate, and the microphone module may be engaged with an end portion of the connection post.

The heat emission device may include an illumination module.

The electronic device may further include a housing cap provided on the surface of the first housing, and at least one mounting post extended in the first direction from the housing cap. The sound reflection plate may be engaged with an end portion of the at least one mounting post.

The electronic device may further include a wiring hole passing through the at least one mounting post, and an inner space of the second housing may communicate with an inner space of the first housing through the wiring hole.

According to an embodiment, an electronic device may include a first housing, a circuit board accommodated in the first housing and including at least a processor and a communication module, a speaker module disposed on a surface of the first housing and configured to output sounds in a first direction, a sound reflection plate mounted above the surface of the first housing and having a first surface facing the speaker module, a second housing fabricated of a transparent or semi-transparent material and having one end engaged with the sound reflection plate, a microphone module engaged with the other end of the second housing opposite to the sound reflection plate, and an illumination module mounted on the second surface of the sound reflection plate. The processor may control at least one of the speaker module or the illumination module based on audio data received through the microphone module.

The sound reflection plate may absorb heat generated from the heat emission device, discharge the absorbed heat to the outside of the electronic device through a space between the surface of the first housing and the first surface of the sound reflection plate, reflect sounds output from the speaker module, and radiate the reflected sounds to the outside of the electronic device through the space between the surface of the first housing and the first surface of the sound reflection plate.

The processor may control at least one of the speaker module or the illumination module based on data received through the communication module.

The processor may receive audio data through the microphone module, and transmit the received audio data through the communication module.

The electronic device may further include a screw bulb base disposed in the first housing, opposite to the speaker module.

The electronic device may further include a heat transfer member disposed between the illumination module and the sound reflection plate.

Accordingly, an electronic device of the present disclosure may discharge heat generated from a heat emission device by means of a sound radiation hole (or space) of an audio device, thereby preventing degradation of the operation performance of an IC chip. Further, since the electronic device does not need an additional device (i.e., a heat radiation fan) or opening in order to form a radiation structure, the electronic device can be simplified and actively discharge heat. As the electronic device is simplified in this manner, fabrication costs (i.e., material costs and labor costs required for assembly) can be reduced.

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. An electronic device comprising:
a first housing;
a speaker module disposed in the first housing, and configured to output sounds in a first direction;
a second housing including a sound hole;
a sound reflection plate disposed in the second housing, wherein the sound reflection plate is located apart from a surface of the first housing, and includes a first surface facing the speaker module;
a heat emission device disposed on a second surface of the sound reflection plate; and
a microphone module exposed outside of the electronic device through the sound hole,
wherein the sound reflection plate is configured to absorb heat generated from the heat emission device, and discharge the absorbed heat to the outside of the electronic device through a space between the surface of the first housing and the first surface of the sound reflection plate.

2. The electronic device of claim 1, wherein the sound reflection plate reflects sounds output from the speaker module, and radiates the reflected sounds through the space between the surface of the first housing and the first surface of the sound reflection plate.

3. The electronic device of claim 1, wherein the sound reflection plate reflects sounds output from the speaker module, and radiates the reflected sounds in 360-degree directions at least from a plane perpendicular to the first direction.

4. The electronic device of claim 1, wherein the speaker module outputs sounds in the first direction, and the sound reflection plate reflects the sounds output from the speaker module in a tilted direction or a perpendicular direction with respect to the first direction.

5. The electronic device of claim 1, wherein the heat emission device includes at least one of an illumination module, a display device, a camera module, or an electromagnetic induction coil.

6. The electronic device of claim 1, further comprising a bulb base disposed in the first housing, opposite to the speaker module.

7. The electronic device of claim 1, further comprising a heat transfer member disposed between the heat emission device and the sound reflection plate.

8. The electronic device of claim 1, wherein the second housing is fabricated of a transparent or semi-transparent material, and
wherein the sound reflection plate is engaged with one end of the second housing.

9. The electronic device of claim 8, wherein the microphone module is engaged with the other end of the second housing, opposite to the sound reflection plate.

10. The electronic device of claim 9, further comprising a screw bulb base in the first housing, opposite to the speaker module,
wherein the microphone module is disposed on a rotational axis of the screw bulb base.

11. The electronic device of claim 9, further comprising a connection post extended from the second surface of the sound reflection plate,
wherein the microphone module is engaged with an end portion of the connection post.

12. The electronic device of claim 9, wherein the heat emission device includes an illumination module.

13. The electronic device of claim 8, further comprising:
a housing cap provided on the surface of the first housing; and
at least one mounting post extended in the first direction from the housing cap,
wherein the sound reflection plate is engaged with an end portion of the at least one mounting post.

14. The electronic device of claim 13, further comprising a wiring hole passing through the at least one mounting post,
wherein an inner space of the second housing communicates with an inner space of the first housing through the wiring hole.

15. An electronic device comprising:
a first housing;
a circuit board accommodated in the first housing, and including at least a processor and a communication module;
a speaker module disposed in the first housing, and configured to output sounds in a first direction;
a sound reflection plate located apart from a surface of the first housing, and having a first surface facing the speaker module;
a second housing fabricated of a transparent or semi-transparent material, and having one end engaged with the sound reflection plate, wherein the second housing includes a sound hole;
a microphone module engaged with the other end of the second housing, opposite to the sound reflection plate, wherein the microphone module is exposed outside of the electronic device through the sound hole; and
an illumination module mounted on a second surface of the sound reflection plate,
wherein the processor is configured to control at least one of the speaker module or the illumination module based on audio data received through the microphone module.

16. The electronic device of claim 15, wherein the sound reflection plate absorbs heat generated from the heat emission device, discharges the absorbed heat to the outside of the electronic device through a space between the surface of the first housing and the first surface of the sound reflection plate, reflects sounds output from the speaker module, and radiates the reflected sounds to the outside of the electronic device through the space between the surface of the first housing and the first surface of the sound reflection plate.

17. The electronic device of claim 15, wherein the processor controls at least one of the speaker module or the illumination module based on data received through the communication module.

18. The electronic device of claim 15, wherein the processor receives audio data through the microphone module, and transmits the received audio data through the communication module.

19. The electronic device of claim 15, further comprising a screw bulb base disposed in the first housing, opposite to the speaker module.

20. The electronic device of claim 15, further comprising a heat transfer member disposed between the illumination module and the sound reflection plate.

\* \* \* \* \*